(12) United States Patent
Wey et al.

(10) Patent No.: US 8,077,171 B2
(45) Date of Patent: Dec. 13, 2011

(54) SIGNAL REGULATOR MODULE AND RELATED DISPLAY DEVICE

(75) Inventors: Chin-Der Wey, Hsin-Chu (TW); Yi-Chun Yeh, Hsin-Chu (TW); Chia-Hung Sun, Hsin-Chu (TW); Huang-De Lin, Hsin-Chu (TW)

(73) Assignee: AU Optronics Corp., Science-Based Industrial Park, Hsin-Chu (TW)

(*) Notice: Subject to any disclaimer, the term of this patent is extended or adjusted under 35 U.S.C. 154(b) by 1105 days.

(21) Appl. No.: 11/853,022

(22) Filed: Sep. 11, 2007

(65) Prior Publication Data
US 2008/0100608 A1 May 1, 2008

(30) Foreign Application Priority Data
Sep. 11, 2006 (TW) .............................. 95133435 A (51) Int. Cl.
*G06F 3/038* (2006.01)
*G09G 5/00* (2006.01)

(52) U.S. Cl. ....................................... 345/212; 315/291
(58) Field of Classification Search ........................ None
See application file for complete search history.

(56) References Cited

U.S. PATENT DOCUMENTS

| | | | | |
|---|---|---|---|---|
| 4,121,136 A * | 10/1978 | Fournier et al. | ................ | 315/205 |
| 4,191,914 A * | 3/1980 | Lecluse | ......................... | 318/139 |
| 5,705,979 A * | 1/1998 | Fierro et al. | ................... | 340/517 |
| 6,445,137 B1 * | 9/2002 | Okamoto et al. | ............. | 315/246 |
| 6,586,890 B2 * | 7/2003 | Min et al. | ........................ | 315/224 |
| 7,276,861 B1 * | 10/2007 | Shteynberg et al. | ........... | 315/291 |
| 2003/0117698 A1 * | 6/2003 | Williams et al. | .......... | 359/341.41 |
| 2004/0178781 A1 | 9/2004 | Lin | | |
| 2004/0208024 A1 * | 10/2004 | Nagano et al. | ................... | 363/19 |
| 2005/0029967 A1 | 2/2005 | Chen | | |
| 2005/0093488 A1 * | 5/2005 | Hung et al. | .................... | 315/307 |
| 2005/0174818 A1 | 8/2005 | Lin | | |
| 2005/0270808 A1 * | 12/2005 | Choi et al. | .................. | 363/21.01 |
| 2006/0038512 A1 * | 2/2006 | Tani | .............................. | 315/291 |
| 2006/0273743 A1 * | 12/2006 | Adam | ........................... | 315/308 |
| 2007/0035538 A1 * | 2/2007 | Garcia et al. | ................... | 345/212 |
| 2007/0103127 A1 * | 5/2007 | Liu et al. | ........................ | 323/273 |
| 2007/0200130 A1 * | 8/2007 | Behringer et al. | .............. | 257/99 |

FOREIGN PATENT DOCUMENTS

| | | |
|---|---|---|
| CN | 1635409 A | 7/2005 |
| CN | 1811886 A | 8/2006 |
| CN | 1826031 A | 8/2006 |
| TW | 560664 | 11/2003 |

* cited by examiner

*Primary Examiner* — Amare Mengistu
*Assistant Examiner* — Antonio Xavier
(74) *Attorney, Agent, or Firm* — Winston Hsu; Scott Margo (57) ABSTRACT

A signal regulator module includes a floating current regulator, a signal sensor, and a feedback controller. The floating current regulator is electrically coupled to a driving circuit and the light sources of a display panel for regulating the driving signals based on a feedback signal in a photo couple means. The signal sensor is electrically coupled to the floating current regulator for generating a corresponding voltage signal based on the driving signal through a photo couple means. The feedback controller is electrically coupled to the signal sensor and the floating current regulator for generating the feedback signal based on the voltage signal and outputting the feedback signal to the floating current regulator.

14 Claims, 7 Drawing Sheets

SIGNAL REGULATOR MODULE AND RELATED DISPLAY DEVICE

BACKGROUND OF THE INVENTION

1. Field of the Invention

The present invention relates to a signal regulator module, and more particularly, to a signal regulator module capable of adjusting driving signals outputted by a driving circuit to light sources of a display panel.

2. Description of the Prior Art

A liquid crystal display (LCD) device can provide rich images by controlling liquid crystal pixels of a display panel using transistors arranged in matrix, together with appropriate electronic components such as capacitors, switches, and pads. Due to thin appearances, low power consumption, and low radiation, LCD devices have gradually replaced traditional cathode ray tube (CRT) displays and are widely used in portable electronic devices such as notebook computers, personal digital assistants (PDA) and digital cameras.

Generally speaking, an LCD device includes an LCD panel and a backlight module disposed at the lower or lateral sides of the LCD panel. A light source and various optical devices (such as diffusion plates and prisms) are used for providing high-intensity and uniform light for the LCD panel. By controlling the luminance of liquid crystal pixels, the LCD device can display corresponding images. Being the key device in an LCD device, the backlight module including a light source and an optical film, is capable of providing uniform light. Based on the location of the light source, backlight modules can be categorized into direct-type and edge-type backlight modules. In a direct-type backlight module, light is generated directly beneath the LCD panel. In an edge-type backlight module, light is generated near the lateral sides of the LCD panel. Since light of higher-intensity is provided when generated directly beneath the LCD panel, the direct-type backlight module can be applied in high-brightness or large-size LCD panels, such as in flat panel television sets.

Figure 1:
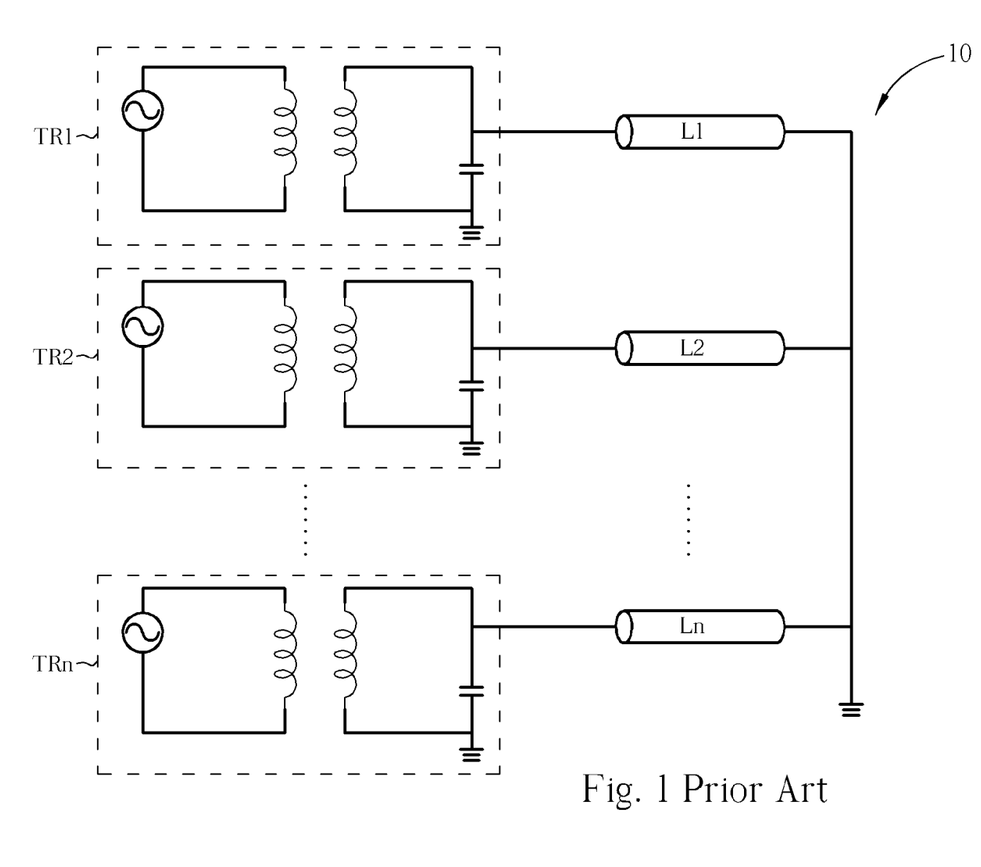
FIG. 1 is a diagram of a prior art LCD backlight module driving circuit.

Referring to FIG. 1. FIG. 1 is a diagram of a prior art LCD backlight module driving circuit 10. The LCD backlight module driving circuit 10 includes a plurality of transformers TR1-TRn for respectively driving lamps L1-Ln. In the prior art LCD backlight module driving circuit 10, each lamp is driven by a transformer. With increasing demands in large-size applications, the panel size becomes larger and the number of lamps used in the LCD device also increases accordingly. Therefore, the prior art LCD backlight module driving circuit 10 requires more transformers, which largely raises manufacturing costs.

Figure 2:
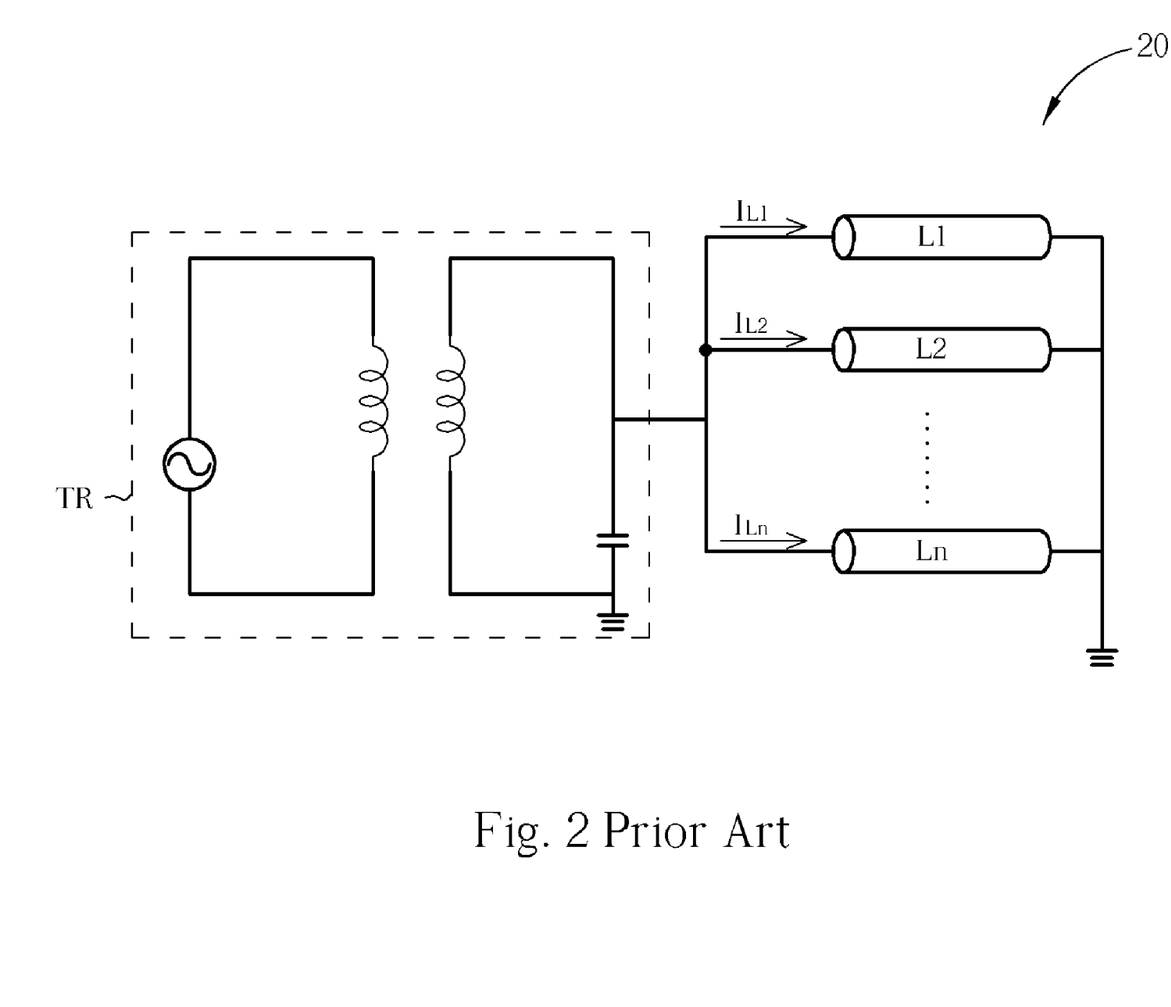
FIG. 2 is a diagram of another prior art LCD backlight module driving circuit.

Referring to FIG. 2. FIG. 2 is a diagram of another prior art LCD backlight module driving circuit 20. The LCD backlight module driving circuit 20 includes a transformer TR for simultaneously driving lamps L1-Ln. $I_{L1}$-$I_{Ln}$ represent the currents passing through the lamps L1-Ln, respectively. In the prior art LCD backlight module driving circuit 20, a transformer is used for driving multiple lamps. Therefore, in large-size applications, the number of the transformers and driving switches can be reduced, thereby cutting manufacturing costs. However, since the lamps L1-Ln may have different characteristics, the currents $I_{L1}$-$I_{Ln}$ passing through the lamps L1-Ln may also vary. Each lamp can thus provide distinct luminance, which lowers the uniformity of the backlight module and influences the display quality of the LCD device.

Figure 3:
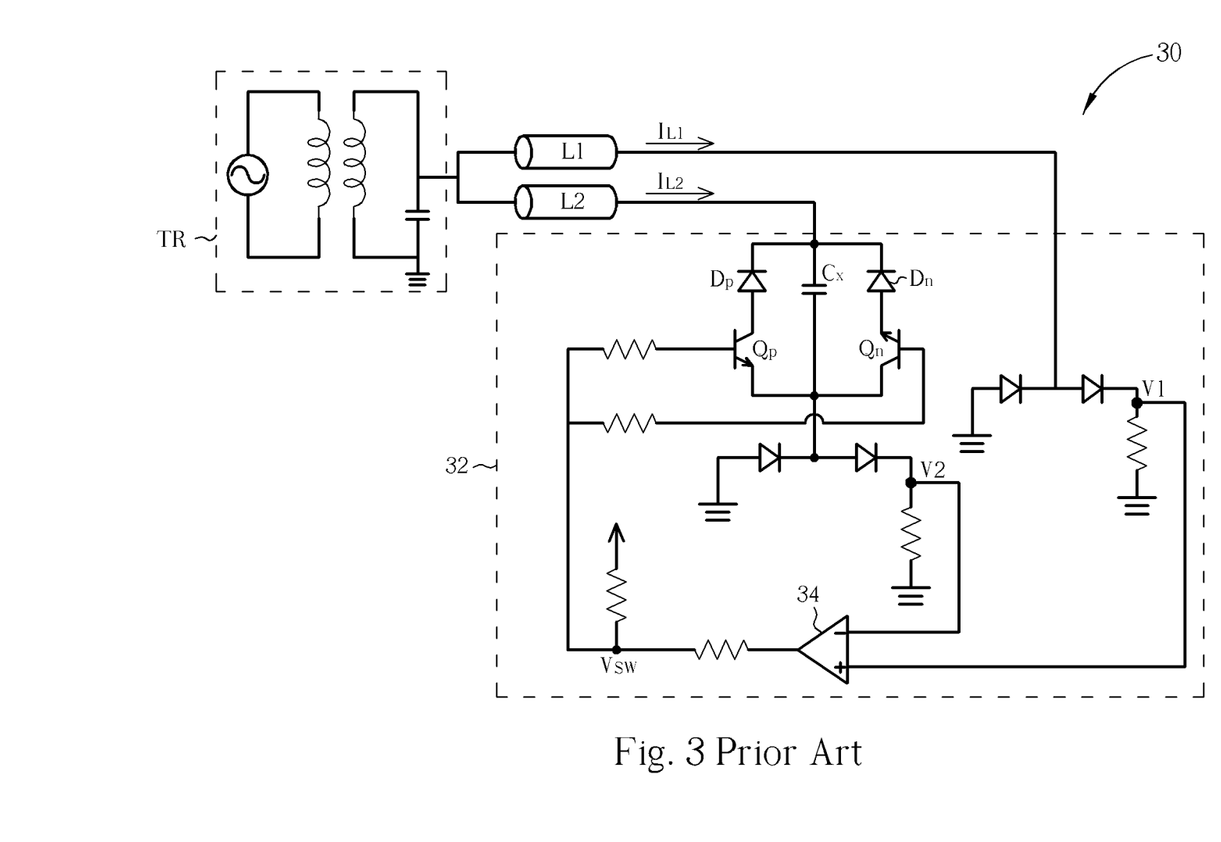
FIG. 3 is a diagram of another prior art LCD backlight module driving circuit.

Referring to FIG. 3. FIG. 3 is a diagram of another prior art LCD backlight module driving circuit 30. In the LCD backlight module driving circuit 30, a balance circuit is used for improving the current uniformity when driving multiple lamps, and only two lamps are depicted in FIG. 3 for ease of illustration. The LCD backlight module driving circuit 30 includes a transformer TR and a balance circuit 32 for driving lamps L1 and L2. $I_{L1}$ and $I_{L2}$ represent the currents passing through the lamps L1 and L2, respectively. The balance circuit 32 includes active components such as transistors Qp and Qn, diodes Dp and Dn, comparator 34, and impedance device Cx. Since the balance circuit 32 adopts an active design, it generates a feedback signal V1 pertaining to the current $I_{L1}$ and a feedback signal V2 pertaining to the current $I_{L2}$. The comparator 34 can compare the feedback signals V1 and V2, output a corresponding switch voltage signal Vsw based on the difference between the feedback signals V1 and V2, and send the switch voltage signal Vsw to the gates of the transistors Qp and Qn. In response to the switch voltage signal Vsw, the transistors Qp and Qn are turned on and turned off for regulating the current $I_{L2}$, so that the current $I_{L2}$ can approach the current $I_{L1}$.

In the prior art LCD backlight module driving circuit 30 having an active design, current adjustment is performed based on the actual feedback current. Under environmental influences, lamp currents can still be regulated to nominal values. However, the transistors Qp and Qn of the LCD backlight module driving circuit 30 operate in the switching region in which the current waveforms of the lamps can have asymmetrical positive/negative half periods due to characteristic variations in the transistors (such as the turn-on and turn-off speeds). Unless a direct current (DC) signal is applied continually, the current waveforms of the lamps can deform, which shortens the life of the lamps. Although the feedback signal V2 pertaining to the actual current $I_{L2}$ of the lamp L2 is used in the LCD backlight module driving circuit 30, the comparator 34, merely capable of outputting logic signals having high/low levels, cannot reveal the accurate difference between the currents $I_{L1}$ and $I_{L2}$. Due to slow response speed of the comparator 34, it takes a long time for the LCD backlight module driving circuit 30 to reach equilibrium. Also, since the balance circuit 32 can only be used at the low-voltage end of the lamps, the LCD backlight module driving circuit 30 cannot be applied to large-size panels having a dual-side driving structure.

SUMMARY OF THE INVENTION

The present invention provides a signal regulator module for adjusting driving signals outputted by a driving circuit to light sources of a display panel comprising a first floating current regulator electrically coupled to the driving circuit and a first light source of the display panel for regulating a first driving signal outputted by the driving circuit to the first light source, adjusting the first driving signal based on a first feedback signal in a photo couple means, and outputting the adjusted first driving signal; a first signal sensor electrically coupled to the first floating current regulator for generating a corresponding first voltage signal based on the first driving signal in a photo couple means; and a feedback controller electrically coupled to the first signal sensor and the first floating current regulator for generating the first feedback signal based on the first voltage signal and outputting the first feedback signal to the first floating current regulator.

The present invention also provides a display device capable of adjusting driving signals comprising a light generating means for providing light in response to a driving signal; a driving means for generating the driving signal; and a signal adjusting means for generating a corresponding feedback signal by sensing the driving signal through a photo couple means, adjusting the driving signal in response to the feedback signal, and outputting the adjusted driving signal to the light generating means.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
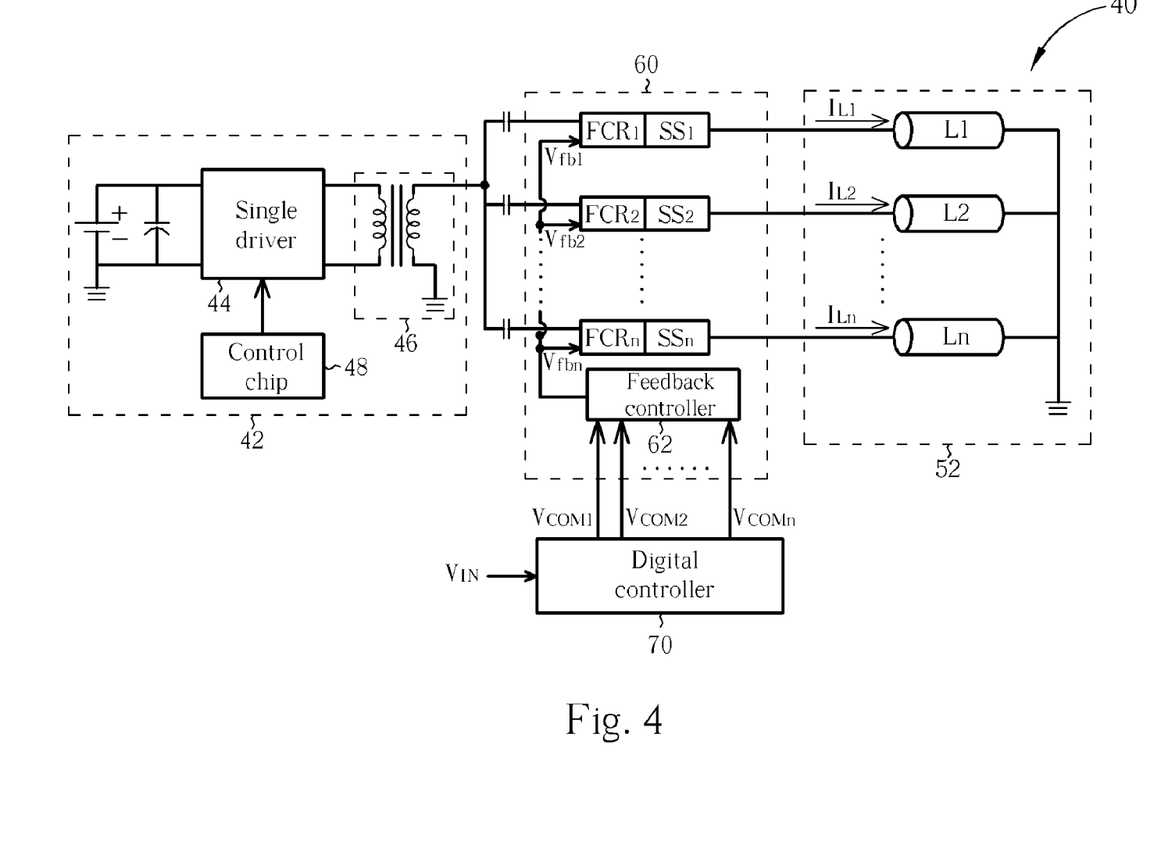
FIG. 4 is a diagram of an LCD backlight module according to the present invention.

Referring to FIG. 4. FIG. 4 is a diagram of an LCD backlight module 40 according to one embodiment of the present invention. The LCD backlight module 40, including a driving circuit 42, a signal regulator module 60 and a digital controller 70, can drive a lamp module 52 having a single lamp or a plurality of lamps. In FIG. 4, lamps L1-Ln are used for illustrating the embodiment, and $I_{L1}$-$I_{Ln}$ respectively represent the currents passing through the lamps L1-Ln. The driving circuit 42 includes a single driver 44, a single transformer 46 and a control chip 48. The single driver 44 can transform an input DC voltage into an alternative current (AC) voltage. The single transformer can then enhance the AC voltage for providing appropriate voltages for the lamp module 52. The control chip 48 can provide control signals required for operating the LCD backlight module 40.

The signal regulator module 60 includes floating current regulators FCR1-FCRn, signal sensors SS1-SSn, and a feedback controller 62. The signal regulator module 60 detects the currents $I_{L1}$-$I_{Ln}$ passing through the lamps L1-Ln respectively using the signal sensors SS1-SSn, and then sends feedback signals $V_{fb1}$-$V_{fbn}$ respectively to the floating current regulators FCR1-FCRn using the feedback controller 62. The floating current regulators FCR1-FCRn can then adjust the values of the currents $I_{L1}$-$I_{Ln}$ respectively based on the feedback signals $V_{fb1}$-$V_{fbn}$ on a real time basis. The signal regulator module 60 adopts an active design and can perform real-time current regulation based on the actual current passing through each lamp. Each lamp can thus provide current of the nominal value. The signal regulator module 60 and the driving circuit 42 can be disposed on the same printed circuited board (PCB), or separately on two different PCBs. The signal regulator module 60 can include an integral-type integrated circuit manufactured in a high-pressure process, or a current regulating circuit having circuit devices. The detailed structure of the signal regulator module 60 will be described in the following paragraphs.

The digital controller 70 can achieve image processing by performing various timing and brightness controls on a single lamp or on all lamps of the backlight module. The digital controller 70 receives and processes a control signal $V_{IN}$ sent by the system for image processing, and then outputs signals $V_{COM1}$-$V_{COMn}$ respectively corresponding to the lamps L1-Ln for controlling the luminance of the lamps on a real time basis. By providing the most appropriate light intensity, display images can have a better visual performance in contrast and brightness. If the LCD backlight module 40 does not receive the control signal $V_{IN}$ for image processing, the digital controller 70 operates based on its default settings. Under these circumstances, the LCD backlight module 40 performs current regulation via the signal regulator module 60, thereby equalizing the current passing through each lamp. If the LCD backlight module 40 receives the control signal $V_{IN}$ for image processing, the LCD backlight module 40 first performs current regulation via the signal regulator module 60, thereby equalizing the current passing through each lamp. Next, the digital controller 70 outputs the signals $V_{COM1}$-$V_{COMn}$ based on the control signal $V_{IN}$. Image processing can be achieved by controlling the brightness of each lamp. Therefore, the LCD backlight module 40 can provide current regulation and image processing simultaneously.

Figure 5:
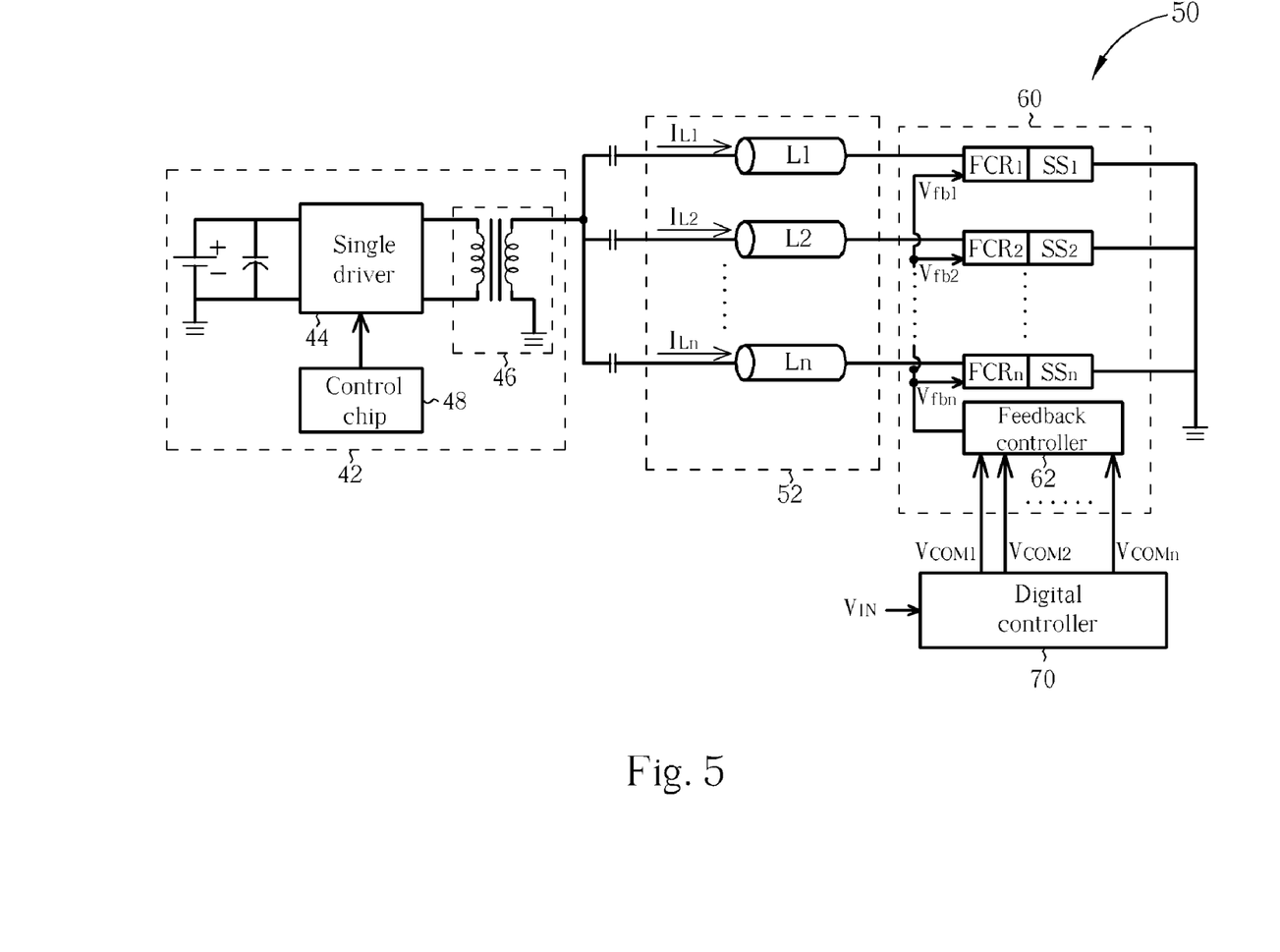
FIG. 5 is a diagram of an LCD backlight module according to the present invention.

Reference is made to FIG. 5 for a diagram of another LCD backlight module 50 according to the present invention. The LCD backlight module 50, also including a driving circuit 42, a signal regulator module 60 and a digital controller 70, can drive the lamp module 52. The LCD backlight module 50 differs from the LCD backlight module 40 in that the signal regulator module 60 of the LCD backlight module 40 is electrically coupled between the driving circuit 42 and the high-voltage terminal of the lamp module 52, while the signal regulator module 60 of the LCD backlight module 50 is electrically coupled between the low-voltage terminal of the lamp module 52 and ground. Since the signal regulator module 60 of the present invention adopts a floating-type design, high voltages and low voltages are isolated in a photo couple means. The present invention can thus operate safely under high potential. Therefore, the signal regulator 60 can be disposed at the high-voltage terminal of the lamp module 52, as illustrated by the LCD backlight module 40 in FIG. 4. Alternatively, the signal regulator 60 can also be disposed at the low-voltage terminal of the lamp module 52, as illustrated by the LCD backlight module 50 in FIG. 5.

Figure 6:
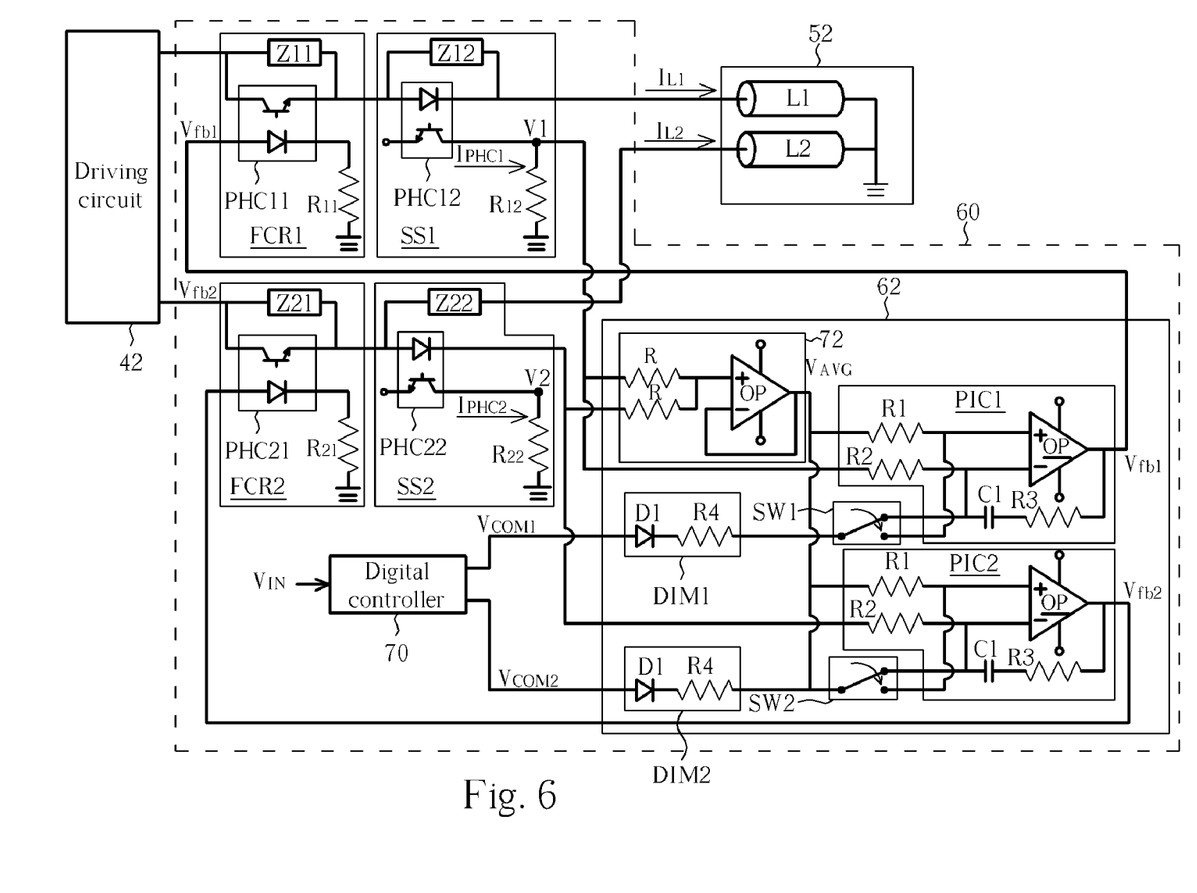
FIG. 6 is a diagram of a signal regulator module according to a first embodiment of the present invention.

Reference is made to FIG. 6 for a diagram of the signal regulator module 60 according to a first embodiment of the present invention. Though the embodiment shown in FIG. 6 can drive multiple lamps, only two lamps are depicted for ease of explanation. In the first embodiment of the present invention, the lamp module 52 includes two lamps L1 and L2. $I_{L1}$ and $I_{L2}$ represent the currents passing through the lamps L1 and L2, respectively. The signal regulator module 60 includes floating current regulators FCR1 and FCR2, signal sensors SS1 and SS2, and a feedback controller 62. In the signal regulator module 60, each of the floating current regulators and the signal sensors includes photo couple devices, impedance devices and resistors. The photo couple device PHC12 of the signal sensor SS1 and the photo couple device PHC22 of the signal sensor SS2 can respectively detect the currents $I_{L1}$ and $I_{L2}$ passing through the lamps L1 and L2. Larger currents $I_{L1}$ and $I_{L2}$ induce larger currents passing through the internal photodiodes of the photo couple devices and lengthen the conducting time of the internal phototransistors of the photo couple devices, thereby resulting in larger internal currents $I_{PHC1}$ and $I_{PHC2}$. At the same time, the current signals $I_{PHC1}$ and $I_{PHC2}$ are transformed into voltage signals $V_1$ and $V_2$ via the resistors R12 and R22, respectively. Consequently, as the currents $I_{L1}$ and $I_{L2}$ increase, the voltage signals $V_1$ and $V_2$ become larger accordingly; as the currents $I_{L1}$ and $I_{L2}$ decrease, the voltage signals $V_1$ and $V_2$ become smaller accordingly.

In the first embodiment of the present invention illustrated in FIG. 6, the feedback controller 62 includes an averaging circuit 72, dimmers DIM1 and DIM2, and proportional integral controllers (PI controllers) PIC1 and PIC2. The averaging circuit 72, electrically coupled to the signal sensors SS1 and SS2, can generate an averaging signal $V_{AVG}$ as the reference voltage for the PI controllers PIC1 and PIC2 when performing a closed-loop feedback control. Due to characteristic variances between different lamps, each lamp provides a distinct current when illuminating. In the first embodiment of the present invention, the averaging circuit 72 can generate an average value of all lamp currents. When the system reaches an equilibrium state, the current provided by each lamp approaches a nominal value and current regulation can be achieved. In the first embodiment of the present invention, the averaging circuit 72, including an operational amplifier OP and a resistor R, can achieve signal isolation and prevent the misoperations of the averaging circuit 72 due to loading effects.

If the lamp module 52 includes lamps L1-Ln, the operation of the averaging circuit 72 can be represented by the following formula:

$$\frac{V_1 - V_{AVG}}{R} = \frac{V_{AVG} - V_2}{R} + \frac{V_{AVG} - V_3}{R} + \frac{V_{AVG} - V_4}{R} + \ldots + \frac{V_{AVG} - V_n}{R}$$

After rearrangement, the following formula is obtained:

$$V_{AVG} = \frac{V_1 + V_2 + \ldots + V_n}{n}$$

Therefore, in the first embodiment of the present invention when the lamp module 52 includes the lamps L1 and L2, the operation of the averaging 72 can be represented by the following formula:

$$V_{AVG} = \frac{V_1 + V_2}{n}$$

If the user wants to adjust the brightness of each lamp in the lamp module 52, a control signal $V_{IN}$ can be inputted to the digital controller 70 for generating reference signals corresponding to each lamp. In the first embodiment of the present invention, when the user wants to adjust the brightness of the lamps L1 and L2, the digital controller 70 generates the control signals $V_{COM1}$ and $V_{COM2}$ respectively corresponding to the lamps L1 and L2.

The dimmers DIM1 and DIM2 can receive image control signals provided by the system or the control signals $V_{COM1}$ and $V_{COM2}$ provided by the digital controller 70. The signals received by the dimmers DIM1 and DIM2 are transmitted to the PI controllers PIC1 and PIC2 via the switches SW1 and SW2, respectively. In the first embodiment of the present invention, the dimmers DIM1 and DIM2, each including a resistor R4 and a diode D1, can control various current waveforms using different output voltages, thereby providing more flexible circuit designs.

Each of the PI controllers PIC1 and PIC2 includes an operational amplifier OP, resistors R1-R3, and a capacitor C1. The positive input ends of the PI controllers PIC1 and PIC2 are electrically coupled to the averaging circuit 72 for receiving the averaging signal $V_{AVG}$. The negative input ends of the PI controllers PIC1 and PIC2 are respectively electrically coupled to the signal sensors SS1 and SS2 for receiving the voltages $V_1$ and $V_2$. The output ends of the PI controllers PIC1 and PIC2 are respectively coupled to the floating current regulators FCR1 and FCR2. The PI controller PIC1 generates a feedback signal $V_{fb1}$ at its output end based on the averaging signal $V_{AVG}$ and the voltage $V_1$, and sends the feedback signal $V_{fb1}$ to the photo couple device PHC11 of the floating current regulator FCR1. Similarly, the PI controller PIC2 generates a feedback signal $V_{fb2}$ at its output end based on the averaging signal $V_{AVG}$ and the voltage $V_2$, and sends the feedback signal $V_{fb2}$ to the photo couple device PHC21 of the floating current regulator FCR2.

The floating current regulators FCR1 and FCR2 can provide current regulation on the lamps using internal photodiodes. For the floating current regulator FCR1, when the feedback signal $V_{fb1}$ becomes larger, the current passing through its photodiode and the resistor R11 increases and the conducting time of its internal phototransistor is lengthened, thereby enlarging the current $I_{L1}$ passing through the lamp L1. On the other hand, when the feedback signal $V_{fb1}$ becomes smaller, the current passing through its photodiode and the resistor R11 decreases and the conducting time of its internal photo transistor is shortened, thereby reducing the current $I_{L1}$ passing through the lamp L1. Also, the impedance devices Z11 and Z21 can include devices such as diodes or capacitors for providing an alternative path for AC sine signals.

Based on different designs, the dimmers DIM1 and DIM2 can be electrically coupled to the positive or negative input ends of the PI controllers PIC1 and PIC2 via the switches SW1 and SW2, respectively. When the dimmers DIM1 and DIM2 are respectively electrically coupled to the negative input ends of the PI controllers PIC1 and PIC2 via the switches SW1 and SW2, the feedback signal provided by the PI controllers PIC1 and PIC2 can be represented by the following formula 1:

$$V_{fb}(t) = V_{AVG} + \frac{R_3}{R_2}(V_{AVG} - V_1) + \frac{1}{R_2C_1}\int_0^\tau (V_{AVG} - V_1)dt + \frac{R_3}{R_4}(V_{AVG} - V_{COM}) + \frac{1}{R_4C_1}\int_0^\tau (V_{AVG} - V_{COM})dt$$

Assuming the resistor R3 is zero, the PI controllers PIC1 and PIC2 function as integral controllers (I controllers), and the feedback signal provided by the PI controllers PIC1 and PIC2 can be represented by the following formula 2:

$$V_{fb}(t) = V_{AVG} + \frac{1}{R_2C_1}\int_0^\tau (V_{AVG} - V_1)dt + \frac{1}{R_4C_1}\int_0^\tau (V_{AVG} - V_{com})dt$$

The control signal $V_{COM}$ can be ignored when only current regulation is required. Based on the formulae 1 and 2, the feedback signal $V_{fb}$ can be stabilized only when the voltage $V_1$ equals to the averaging signal $V_{AVG}$. Therefore, the floating current regulators FCR1 and FCR2 are respectively driven with the feedback signals $V_{fb1}$ and $V_{fb2}$, so that the voltages $V_1$ and $V_2$ generated by the corresponding signal sensors SS1 and SS2 can approach the feedback signals $V_{fb1}$ and $V_{fb2}$, respectively. Consequently, the current passing through each lamp can approach the same value after current regulation. The control signal $V_{COM}$ has to be taken into consideration when image processing is also required. In addition to the voltages $V_1$ and $V_2$, the feedback signals also depend on the control signal $V_{COM}$. Therefore, the feedback signals $V_{fb1}$ and $V_{fb2}$, to which the voltages $V_1$ and $V_2$ respectively approach in an equilibrium state, can be adjusted by respectively controlling the control signals $V_{COM1}$ and $V_{COM2}$.

Figure 7:
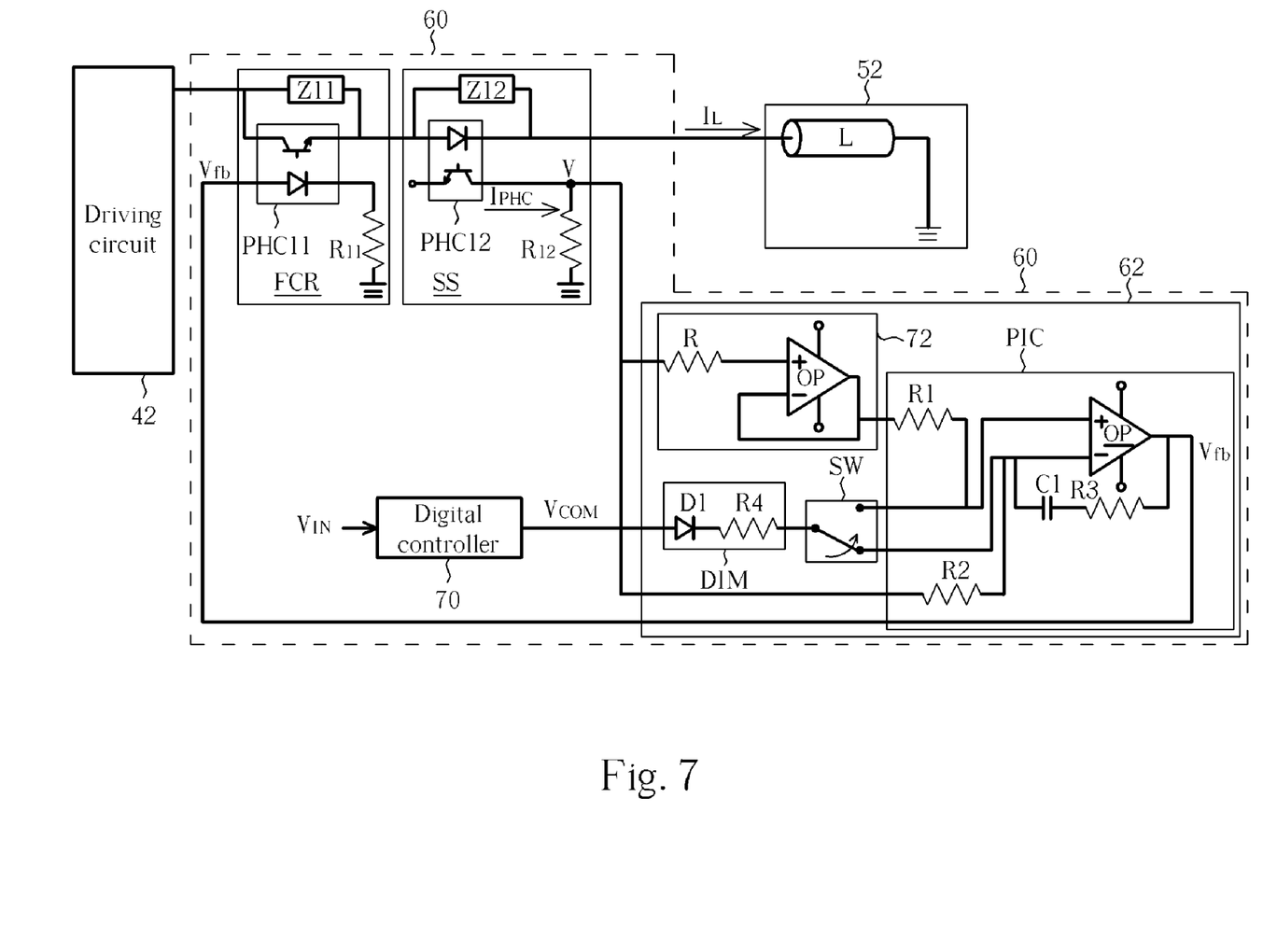
FIG. 7 is a diagram of a signal regulator module according to a second embodiment of the present invention.

Reference is made to FIG. 7 for a diagram of the signal regulator module 60 according to a second embodiment of the present invention. Since the embodiment shown in FIG. 7 is used for driving a single lamp, the lamp module 52 only includes a lamp L. $I_L$ represents the current passing through the lamp L. In the second embodiment of the present invention, the signal regulator module 60 includes a floating current regulators FCR, a signal sensor SS, and a feedback controller 72. The floating current regulator FCR and the signal sensor SS each includes photo couple devices, impedance devices and resistors. Since the embodiment shown in FIG. 7 is used for driving a single lamp, current regulation is not required. After the photo couple device PHC12 of the signal sensor SS detects the current $I_L$ passing through the lamp L, its internal phototransistor generates a corresponding current $I_{PHC}$, which is then transformed to a voltage signal V via the resistor R12.

In the second embodiment of the present invention illustrated in FIG. 7, the feedback controller 62 includes an averaging circuit 72, a dimmer DIM, and a PI controller PIC. Since only one voltage signal V is generated in a single lamp structure, the voltage signal V is transmitted to the PI controller PIC via the averaging circuit 72. If the user wants to adjust the luminance of the lamp L, a control signal $V_{IN}$ can be inputted to the digital controller 70 for generating a reference signal $V_{COM}$ corresponding to the lamp L. The reference signal $V_{COM}$ can then be transmitted to the PI controller PIC via the switch SW.

Based on different designs, the dimmer DIM can be electrically coupled to the positive or negative input ends of the PI controller PIC via the switch SW. When the dimmer DIM is electrically coupled to the negative input end of the PI controller PIC via the switch SW, the feedback signal $V_{fb}$ provided by the PI controller PIC can be represented by the following formula 3:

$$V_{fb}(t) = V + \frac{R_3}{R_4}(V - V_{COM}) + \frac{1}{R_4 C_1}\int_0^\tau (V - V_{COM})dt$$

Assuming the resistor R3 is zero, the PI controller PIC functions as an I controller, and the feedback signal $V_{fb}$ provided by the PI controller PIC can be represented by the following formula 4:

$$V_{fb}(t) = V + \frac{1}{R_4 C_1}\int_0^\tau (V - V_{COM})dt$$

For image processing purposes, the feedback signal $V_{fb}$ can be stabilized only when the voltage V equals to the control signal $V_{COM}$, as illustrated by the formulae 3 and 4. Therefore, the floating current regulator FCR is driven with the feedback signal $V_{fb}$, so that the voltage V generated by the signal sensor SS can approach the control signal $V_{COM}$ for image processing.

The present invention can be applied to various types of LCD devices. Current regulation can be performed when driving multiple lamps for increasing the uniformity of the backlight module. Also, the present invention can achieve image control and image processing (such as light-up sequence, current adjustment and luminance adjustment of the lamps) using a digital controller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal regulator module for adjusting driving signals outputted by a driving circuit to light sources of a display panel comprising:
    a first floating current regulator electrically coupled to the driving circuit and a first light source of the display panel for regulating a first driving signal outputted by the driving circuit to the first light source, adjusting the first driving signal by photo-coupling based on a first feedback signal, and outputting the adjusted first driving signal;
    a second floating current regulator electrically coupled to the driving circuit and a second light source of the display panel for regulating a second driving signal outputted by the driving circuit to the second light source, adjusting the second driving signal by photo-coupling based on a second feedback signal, and outputting the adjusted second driving signal;
    a first signal sensor electrically coupled to the first floating current regulator for generating a corresponding first voltage signal by photo-coupling based on the first driving signal;
    a second signal sensor electrically coupled to the second floating current regulator and the feedback controller for generating a corresponding second voltage signal by photo-coupling based on the second driving signal; and
    a feedback controller comprising:
        an averaging circuit electrically coupled to the first and second signal sensors for receiving the first and second voltage signals, thereby generating an averaging signal corresponding to an average value of the first and second voltage signals;
        a first proportional integral controller (PI controller) electrically coupled to the first floating current regulator and the averaging circuit for adjusting the averaging signal based on the averaging signal and the first reference signal; and
        a second PI controller electrically coupled to the second floating current regulator and the averaging circuit for adjusting the averaging signal based on the averaging signal and the second reference signal; and
    a digital controller electrically coupled to the feedback controller for outputting a first reference signal corresponding to display characteristics of the first light source and a second reference signal corresponding to display characteristics of the second light source to the feedback controller, which thereby generates the first feedback signal based on the averaging signal and the first reference signal, as well as generates the second feedback signal based on the averaging signal and the second reference signal.

2. The signal regulator module of claim 1 wherein the averaging circuit includes an operational amplifier.

3. The signal regulator module of claim 1 wherein:
    the first PI controller comprises:

a first adjusting circuit electrically coupled to the averaging circuit and the digital controller for receiving and adjusting the averaging signal and the first reference signal; and a first operational amplifier comprising:
- a first input end electrically coupled to the first adjusting circuit for receiving the averaging signal adjusted by the first adjusting circuit;
- a second input end electrically coupled to the first adjusting circuit for receiving the first reference signal adjusted by the first adjusting circuit; and
- an output end for outputting the first feedback signal; and the second PI controller comprises:
- a second adjusting circuit electrically coupled to the averaging circuit and the digital controller for receiving and adjusting the averaging signal and the second reference signal; and
- a second operational amplifier comprising:
  - a first input end electrically coupled to the second adjusting circuit for receiving the averaging signal adjusted by the second adjusting circuit;
  - a second input end electrically coupled to the second adjusting circuit for receiving the second reference signal adjusted by the second adjusting circuit; and
  - an output end for outputting the second feedback signal.

4. The signal regulator module of claim 3 wherein each adjusting circuit includes a passive component.

5. The signal regulator module of claim 1 wherein the feedback controller further comprises:
- a first dimmer electrically coupled between the digital controller and the first PI controller for controlling a transmission path of the first reference signal; and
- a second dimmer electrically coupled between the digital controller and the second PI controller for controlling a transmission path of the second reference signal.

6. The signal regulator module of claim 5 wherein each dimmer includes a passive component and a diode.

7. The signal regulator module of claim 1 wherein the first floating current regulator comprises:

a photodiode electrically coupled to the feedback controller for receiving the first feedback signal and for providing light based on a forward-bias current passing through the photodiode, wherein the forward-bias current of the photodiode is related to the first feedback signal; and a phototransistor electrically coupled to the driving circuit and the first light source for adjusting the first driving signal based on an intensity of the light provided by the photodiode, thereby generating the corresponding first driving signal.

8. The signal regulator module of claim 7 wherein the first floating current regulator further comprises an impedance device electrically coupled in parallel with the phototransistor.

9. The signal regulator module of claim 8 wherein the impedance device includes a diode or a passive component.

10. The signal regulator module of claim 1 wherein the first signal sensor comprises:
- a photodiode electrically coupled to the first floating current regulator for receiving the first driving signal and providing light in response to a forward-bias current passing through the photodiode, wherein the forward-bias current of the photodiode is related to the first current signal; and
- a phototransistor electrically coupled to the feedback controller for generating the corresponding first voltage signal in response to an intensity of the light provided by the photodiode.

11. The signal regulator module of claim 10 wherein the first signal sensor further comprises an impedance device electrically connected in parallel with the photodiode.

12. The signal regulator module of claim 11 wherein the impedance device includes a diode or a passive component.

13. The signal regulator module of claim 1 characterized by being electrically coupled between the driving circuit and a high voltage end of the light source.

14. The signal regulator module of claim 1 characterized by being electrically coupled between the driving circuit and a low voltage end of the light source.

* * * * *